United States Patent

[11] 3,589,246

| [72] | Inventor | Kazuo Yasunami<br>Ashiya-shi, Japan |
|---|---|---|
| [21] | Appl. No | 771,881 |
| [22] | Filed | Oct. 30, 1968 |
| [45] | Patented | June 29, 1971 |
| [73] | Assignee | Kobe Steel Ltd.<br>Fukiai-ku, Kobe, Japan |
| [32] | Priority | Nov. 4, 1967 |
| [33] | | Japan |
| [31] | | 42/71053 |

[54] ULTRAHIGH PRESSURE SELF-SEALING DEVICE
7 Claims, 2 Drawing Figs.

[52] U.S. Cl. .................................................. 92/247,
92/205
[51] Int. Cl. .................................................. F16j 9/08
[50] Field of Search .......................................... 92/201,
202, 205, 212, 247, 250, 256, 257, 258

[56] References Cited
UNITED STATES PATENTS

| 896,947 | 8/1908 | Stallman | 92/205 X |
|---|---|---|---|
| 1,358,628 | 11/1920 | Fisher | 92/250 X |
| 1,481,160 | 1/1924 | Switzer | 92/252 X |
| 1,523,986 | 1/1925 | Schmidt | 92/205 |
| 1,974,362 | 9/1934 | Marsh | 92/252 X |
| 2,352,041 | 6/1944 | Van den Berg | 92/258 X |
| 2,756,748 | 7/1956 | Ferguson | 92/250 X |
| 2,792,265 | 5/1957 | Lilleman | 92/256 X |
| 2,961,278 | 11/1960 | Newhall | 92/247 X |
| 3,169,455 | 2/1965 | Hoffmann | 92/205 |
| 3,402,645 | 9/1968 | Nelson | 92/258 |

*Primary Examiner*—Martin P. Schwadron
*Assistant Examiner*—Irwin C. Cohen
*Attorney*—Kurt Kelman ABSTRACT: Apparatus for forming a fluidtight seal between a piston and the walls of the cylinder in which the piston travels. The apparatus is intended for use with ultrahigh pressures in the order of 20,000 atmospheres and comprises a mushroom-shaped pressure receiving member slidably mounted in respect to the cylinder proper. An annular, resiliently deformable, plastic packing member of tetrafluorethylene or the like is interposed between the mushroom-shaped member and the cylinder proper and, under the influence of the back pressure which is developed in the cylinder, the packing member deforms to produce the fluidtight seal.

PATENTED JUN29 1971 3,589,246

INVENTOR
KAZUO YASUNAMI
BY Kurt Kelman
AGENT

3,589,246

ULTRAHIGH PRESSURE SELF-SEALING DEVICE

BACKGROUND OF THE INVENTION

The present invention relates to an ultrahigh pressure self-sealing device, and more particularly to an ultrahigh pressure self-sealing device of the unsupported area type for affording a fluidtight seal between a cylinder and a pressure applying means such as a piston axially movably arranged in the cylinder under ultrahigh pressure of the fluid in the cylinder.

Heretofore, in order to fluidtightly seal a piston sliding in a cylinder to thereby permit high pressure to be developed in the fluid in the cylinder by driving the piston, a self-sealing device of the so-called unsupported area type has been used which comprises a hollow inner member made of high strength steel, for example, and located in front of the piston, a pressure receiving member in the form of mushroom also made of high strength steel or tungsten carbide, for example, and located in front of the inner member and contacting with the fluid in the cylinder at the outer end surface of the enlarged diameter portion of the mushroom member, and an annular resiliently deformable packing member located between the mushroom member and the inner member, the outer diameter of each of the mushroom member, the packing member and the inner member corresponding to the inner diameter of the cylinder, the reduced diameter portion of the mushroom member extending through the hollow space in the annular packing member into the hollow space in the inner member freely movable relative thereto, the outer periphery of the annular packing member closely contacting with the inner wall of the cylinder while the inner periphery thereof closely contacts with the outer peripheral surface of the reduced diameter portion of the mushroom member thereby permitting the packing member to be forcibly urged radially against the inner wall of the cylinder and the outer peripheral surface of the reduced diameter portion of the mushroom member under extremely high pressure rendered to be greater than the pressure exerted by the axial driving force of the piston by virtue of the difference between effective area of the mushroom member receiving the reaction force of the fluid and the effective area of the annular packing member receiving the driving force of the piston so that the fluidtight sealing effect is obtained between the inner wall of the cylinder and the outer peripheral surface of the packing member as well as between the inner peripheral surface of the packing member and the outer peripheral surface of the reduced diameter portion of the mushroom member while the annular packing member is forcibly compressed axially between the mushroom member and the inner member to thereby insure the fluidtight sealing therebetween.

Backup ring means made of a material such as high strength copper may be provided along the inner wall of the cylinder at the positions between the outer peripheral end edges of the mushroom member, the packing member and the inner member, respectively, as well as between the inner peripheral end edges of the packing member and the inner member along the outer peripheral surface of the reduced diameter portion of the mushroom member so as to insure the proper sealing action of the packing member by preventing the undue deformation or extrusion of the packing member.

However, with such a construction of the self-sealing device of the prior art, breakage of the mushroom member called pinch-off effect cannot be avoided at the position where the reduced diameter portion thereof is connected to the enlarged diameter portion of the mushroom member when the device is used under high pressure. Once breakage occurs in the mushroom member during the operation of the self-sealing device, loosening of the enlarged diameter portion of the mushroom member from the packing member as well as the relative axial movement between the reduced diameter portion of the mushroom member and the packing member necessarily occurs due to the deformation of the mushroom member in the portion where the breakage takes place, so that the sealing effect of the device is instantaneously deteriorated thereby destroying the proper operation of the device. Therefore, the self-sealing device of the prior art is limited its use for the pressure of the fluid up to several thousand atmospheric pressure at the highest.

In order to improve the self-sealing device, the present inventor had proposed a self-sealing device of the unsupported area type as disclosed in Japanese Pat. Publn. No. 3324/67. The proposed device is of the general construction similar to that described above except that the reduced diameter portion of the mushroom member is connected to the enlarged diameter portion thereof by the interposition of a conical portion with its greater diameter end being continuously joined to the enlarged diameter portion of the mushroom member while the lesser diameter end of the conical portion is continuously joined to the reduced diameter portion of the mushroom member, backup ring means being fitted around the outer peripheral surface of the conical portion, an auxiliary packing member made of a material such as synthetic rubber having a relatively low longitudinal modulus of elasticity, i.e., Young's modulus and a main packing member made of a synthetic resin having the plastic character capable of being rendered to be hydrostatic nature under the ultrahigh pressure applied thereto and having an inner diameter slightly greater than the outer diameter of the reduced diameter portion of the mushroom member being fitted on the reduced diameter portion of the mushroom together with copper packing members, for example, in superposed relationship to each other between the above described backup ring means and the end surface of the inner member.

The self-sealing device of the prior art can in effect be used under ultrahigher pressure such as 7,000—15,000 atmospheric pressure or more without making the construction thereof complicated, thereby having contributed significantly in the industrial field of ultrahigh pressure.

With such an sealing device as described above, however, breakage of the mushroom member, i.e., the pinch-off effect cannot be avoided when the device is used for generating ultrahigh pressure of about 20,000 atmospheric pressure or more.

The present inventor has investigated the cause why the pinch-off effect occurs in the mushroom member under the high fluid pressure and found out that significant concentrated axial tensile stress takes place together with radial compressive stress in the mushroom member at the position at which the reduced diameter portion of the mushroom member is connected to the enlarged diameter portion thereof when the self-sealing device is used under high pressure so that, when the axial tensile stress thus generated in the mushroom member exceeds the breaking strength thereof, the pinch-off effect takes place as disclosed in the treatise entitled "Research for fluid-sealing packings under the pressure of 15 kb or more," by Kazuo Yasunami, Tamotsu Fukuda, Kobe Steel Ltd., which was distributed in Japan on Aug. 18, 1968.

On the basis of the research for the fluid-sealing packings made by the present inventor, the present invention aims at obtaining a novel and useful self-sealing device of the type which can be used under the fluid pressure of at least 20,000, atmospheric pressure.

SUMMARY OF THE INVENTION

An object of the present invention is to provide a novel and useful ultrahigh pressure self-sealing device which can be used under the ultrahigh fluid pressure of at least 20,000, atmospheric pressure.

Another object of the present invention is to provide a novel and useful ultrahigh pressure self-sealing device of the type described above which can be used under the pressure of at least 20,000 atmospheric pressure by constructionally excluding the occurrence of the pinch-off effect in the self-sealing device.

These objects can be achieved in accordance with the present invention by an ultrahigh pressure self-sealing device for sealing pressure applying means such as a piston and the like axially movably located in a cylinder of the corresponding diameter with which it is to be sealed and adapted to be driven so that ultrahigh pressure is generated in the fluid lead into the cylinder, the self-sealing device comprising a pressure receiving member having a cross-sectional area corresponding to that of the cylinder and located in front of the pressure applying means axially movably with respect thereto and an annular resiliently deformable packing member located in the cylinder between the pressure receiving member and the pressure applying means so that it is confined axially between the pressure receiving member and the pressure applying means while it is confined radially outwardly with its outer periphery by the cylinder and radially inwardly with its inner periphery by core means located concentrically in the hollow space in the annular packing member thereby permitting the packing member to be forcibly urged radially outwardly against the cylinder and radially inwardly against the core means under the pressure rendered to be significantly greater than the pressure applied axially by the pressure applying means by virtue of the difference between the effective area of the pressure receiving member receiving the reactionary pressure from the fluid in the cylinder and the effective pressure receiving area of the annular packing member, the self-sealing device being characterized in that the core means is so arranged in the hollow space in the annular packing member that it is freely movable axially, with respect to the pressure receiving member, as well as the pressure applying means, thereby permitting the core means to be firmly engaged with the inner periphery of the packing member independently of the axial movement of the pressure receiving member and the pressure applying means so that the occurrence of the axial tensile stress in the core means which has been the fatal defect in the prior art self-sealing device is completely excluded.

In the self-sealing device of the present invention, a hollow cylindrical inner member may be located in the cylinder between the packing member and the pressure applying means, and the pressure receiving member is provided with a coaxial blind hole opening at the side at which the pressure receiving member abuts against the packing member, the core means extending freely movably axially into the blind hole of the pressure receiving member and the hollow space in the hollow cylindrical inner member with an appropriate clearance held therebetween, respectively, so that the manufacture of the pressure applying means is facilitated.

Further, the self-sealing device of the present invention may be provided with backup ring means at both or either one of the positions between the outer periphery of the pressure receiving member and that of the packing member and between the outer periphery of the hollow cylindrical inner member and that of the packing member, so that the proper sealing action is obtained by preventing the undue deformation or extrusion of the packing member. Similarly, further backup ring means may be located along both or either one of the inner peripheral edges of the packing member so as to obtain proper sealing action thereof by preventing the packing member from being unduly deformed or extruded. The core means may be provided at its one end with engaging means such as a thread loosely engageable with the corresponding engaging means provided in the blind hole of the pressure receiving member, while engaging means such as a thread may be provided at its other end for facilitating the assembly and disassembly of the self-sealing device. The packing member is preferably made of a material of plastically flowable and self-lubricating nature under high pressure such as tetrafluoroethylene. And the backup ring means are preferably made of a material such as beryllium copper having high strength and self-lubricating nature.

With the construction of the self-sealing device of the present invention as described above, when the pressure applying means is driven so that the fluid in the cylinder is compressed to generate high pressure therein, the pressure receiving member is subjected to the reaction force from the fluid thereby axially compressing the packing member between the pressure applying means or the inner member and the pressure receiving member, the total reactionary pressure applied to the entire end surface of the pressure receiving member by the fluid being concentrated to the annular area of the packing member smaller than the total area of the end surface of the pressure receiving member, thereby significantly increasing the pressure applied to the packing member. This axial compression of the packing member results in the tight sealing action between the pressure receiving member and the packing member as well as between the packing member and the pressure applying means or the inner member, and, at the same time, it causes the radial expansion of the packing member so as to effect the tight sealing action between the inner wall of the cylinder and the outer peripheral surface of the packing member as well as between the inner peripheral surface of the packing member and the outer peripheral surface of the core means. Since the core means is separate from both the pressure receiving member and the pressure applying means or the inner member, the core means assumes the position at which the most effective sealing action is obtained between the packing member and the core means regardless of the deformation or stresses occurring in the pressure receiving member during the operation of the sealing device.

DETAILED DESCRIPTION OF THE PREFERRED EMBODIMENT

Prior to the description of the present invention, a self-sealing device commonly used in the field of the ultrahigh pressure industry will be described in connection with FIG. 1 for the better understanding of the present invention.

Figure 1:
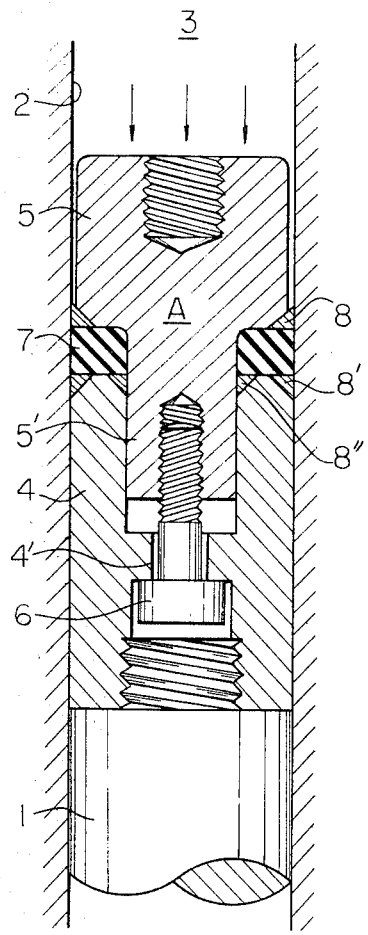
FIG. 1 is a longitudinal cross-sectional view of an ultrahigh pressure self-sealing device of the prior art.

In FIG. 1, a piston 1 serving as a pressure applying means is slidably fitted in a cylinder 2 so as to be axially driven therein to compress fluid 3 in the cylinder 2 in order to generate high pressure in fluid 3. A hollow piston socket 4, i.e., an inner member made of a material such as high strength steel is provided in front of the piston 1. A pistonhead 5 in the mushroom form having a reduced diameter portion 5' and serving as a pressure receiving member is located in front of the piston socket 4 with the reduced diameter portion 5' loosely fitting in the axial bolt of the piston socket 4. A connecting hole 6 is threaded into a threaded hole provided at the end of the reduced diameter portion 5' through a hole 4' of the piston socket 4 so that the reduced diameter portion 5' of the pistonhead 5 is prevented from being withdrawn from the hole of the piston socket 4 while the pistonhead 5 is permitted to move axially relative to the piston socket 4 by a small distance. An annular packing member 7 made of a material such as leather is provided around the reduced diameter portion 5' of the pistonhead 5 between the end surface of the piston socket 4 and the shoulder of the pistonhead 5. The outer peripheral surface of the packing member 7 contacts the inner wall of the cylinder 2 while the inner peripheral surface contacts the outer peripheral surface of the reduced diameter portion 5' so that, when the piston 1 is driven so as to compress the fluid 3, the packing member 7 is axially compressed between the piston socket 4 and the pistonhead 5 by the driving force of the piston 1 and the reactionary force by the fluid 3 so that the firm sealing effect is obtained between the mating surfaces of the piston socket 4, the packing member 7 and the pistonhead 5, respectively, and at the same time, the packing member is radially expanded by virtue of the axial compression thereof so that the firm sealing effect is obtained between the inner wall of the cylinder 2 and the outer peripheral surface of the packing member 7 as well as between the outer peripheral surface of the reduced diameter portion 5' of the pistonhead 5 and the inner peripheral surface of the packing member 7. Backup ring means 8, 8' and 8" made of a material such as phosphor bronze and having triangular cross section may be arranged at the outer peripheral end edges of the packing member 7 as well as at one of the inner peripheral end edges thereof abutting against the end surface of the piston socket 4 so as to prevent the undue deformation or extrusion of the packing member 7 to thereby insure proper sealing action of the packing ring 7. Since the total reactionary force applied by the fluid 3 to the end surface of the enlarged portion of the pistonhead 5 as the result of the driving of the piston 1 is given to the annular packing member 7 the area of which is significantly smaller than the area of the enlarged portion of the pistonhead 5 which receives the reactionary pressure from the fluid 3, the compressive stress occurring in the packing member 7 is significantly great so that the radial expansion of the packing member 7 is augmented to thereby insure tight sealing effect between the inner wall of the cylinder 2 and the outer peripheral surface of the packing member 7 as well as between the inner peripheral surface thereof and the outer peripheral surface of the reduced diameter portion 5' of the pistonhead 5 while the tight sealing effect is obtained between the shoulder of the pistonhead 5, the packing member 7 and the end surface of the piston socket 4, respectively.

However, as previously described, as the pressure of the fluid 3 increases by the driving of the piston 1, significant concentrated axial tensile stress appears at the position in the pistonhead 5 as indicated by A while the radial compressive stress takes place in the region where the reduced diameter portion 5' is connected to the enlarged diameter portion of the pistonhead 5 so that the breakage, i.e., the pinch-off effect, occurs at the position A when the fluid pressure reaches the value of about several thousand atmospheric pressure.

The breakage of the pistonhead 5 results in a sudden leakage of the fluid thereby rapidly decreasing the fluid pressure for the reason as previously described so that the self-sealing device is rendered useless.

Figure 2:
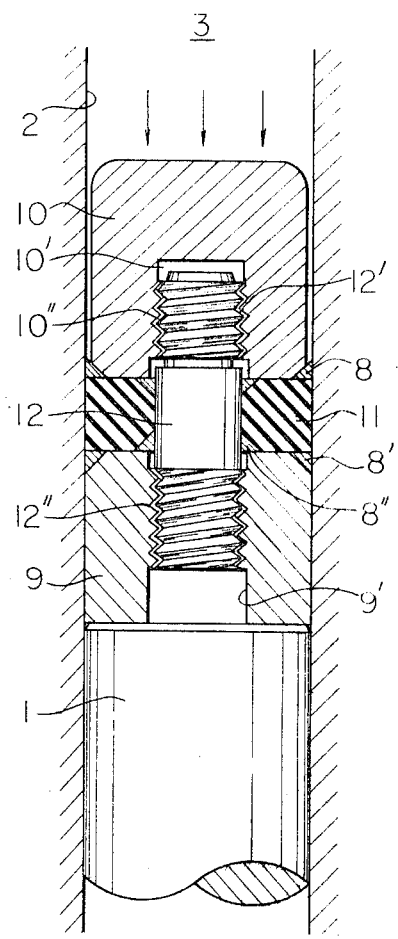
FIG. 2 is a view similar to FIG. 1 but showing a preferred embodiment of the ultrahigh pressure self-sealing device constructed in accordance with the present invention.

In order to avoid the above defect, the present invention provides a novel and useful self-sealing device by which the pinch-off effect can be theoretically and constructionarily avoided as shown in FIG. 2.

In FIG. 2, a piston 1 serving as a pressure applying means as in the case of FIG. 1 is slidably fitted in a cylinder 2 so as to be driven axially to compress the fluid 3 in the cylinder 2. A cylindrical inner member 9 made of a material such as high strength steel and tungsten carbide is slidably fitted in the cylinder 2 in front of the piston 1. The inner member 9 is provided with a central through hole 9'. A pressure receiving member 10 made of a material such as high strength steel and tungsten carbide and having a diameter corresponding to that of the cylinder 2 is slidably fitted in the cylinder 2 in front of the inner member 9. The pressure receiving member 10 is provided with a central blind hole 10' opening at the end surface of the pressure receiving member facing to the end surface of the inner member 9. An annular packing member 11 made of a material such as fluorine resin, tetrafluoroethylene and the like which has such a character that it is rendered to be self-lubricating and hydrostatical nature under the ultrahigh pressure is interposed between the pressure receiving member 10 and the inner member 9. Further, a core member 12 having a diameter smaller than that of the pressure receiving member 10 is concentrically arranged in the cylinder 2 with its one end being loosely fitted in the blind hole 10' of the pressure receiving member 10 with an appropriate clearance held therebetween while the other end extends into the through hole 9' of the inner member 9 with an appropriate clearance held therebetween so that the core means 12 can be moved axially a small amount relative to the pressure receiving member 10 while the core means 12 is prevented from being retracted from the blind hole 10'. The core member 12 may be provided at its one end with an engaging means 12' such as a thread which is loosely engaged with the mating engaging means 10" such as a thread provided in the blind hole 10' thereby preventing the core means 12 from being withdrawn from the blind hole 10' while the core means 12 is permitted to move axially relative to the pressure receiving member 10 by a small distance, so that the assembly or disassembly of the sealing device is facilitated. In like manner, the other end of the core means 12 may be provided with an engaging means 12" such as a thread so as to facilitate the assembly or disassembly of the sealing device.

The outer peripheral surface of the packing member 11 contacts with the inner wall of the cylinder 2 while the inner peripheral surface of the packing member 11 contacts with the outer peripheral surface of the core means 12.

Thus, when the piston 1 is driven to compress the fluid 3 in the cylinder 2, the reactionary pressure of the fluid 3 is applied to the pressure receiving member 10 thereby axially compressing the packing member 11 by a pressure significantly greater than the pressure generated in the fluid by the driving of the piston 1 due to the difference between the effective area of the pressure receiving member 10 and that of the annular packing member 11 as in the case of FIG. 1, so that the tight sealing effect is obtained between the pressure receiving member 10, the packing member 11 and the inner member 9, respectively, and, at the same time, the packing member 11 is radially expanded by virtue of that significantly augmented pressure so as to augment the sealing effect between the inner wall of the cylinder 2 and the outer periphery of the packing member as well as between the inner peripheral surface thereof and the outer peripheral surface of the core means 12.

Since the core means 11 is separate from the pressure receiving member 10 as well as from the inner member 9 and the piston 1 and is not subjected directly to the reactionary force applied by the fluid 3 and is allowed to move relatively to the pressure receiving member 10 as well as to the piston 1, the tight sealing effect is maintained between the core means 12 and the packing member 11 even though the deformation and/or displacement take place in the pressure receiving member 10 by the reactionary pressure applied thereto by the fluid 3 due to the driving of the pressure applying means, i.e., the piston 1.

Like the device shown in FIG. 1, backup ring means 8, 8' and 8" having triangular cross section and made of a material such as beryllium copper having high strength and self-lubricating nature under high pressure are preferably provided at either one or both of the outer peripheral end edges and at either one or both of the inner peripheral edges of the packing member 11 as shown in FIG. 2 in order to prevent undue deformation or extrusion of the packing member 11 so that the proper sealing effect is obtained by the packing member 11.

With the self-sealing device of the present invention as described above, a fluid pressure of abut 22,000 atmospheric pressure or more can be obtained without the danger of damaging the self-sealing device.

The material for the packing member 11 is not limited to the fluorine resin but any material having the self-lubricating nature and the plastic nature capable of rendering to be hydrostatic under the ultrahigh pressure can be used for the packing member 11.

In like manner, any material having high strength and self-lubricating nature under high pressure can be used as the backup ring means 8, 8' and 8".

Also, the number of the backup ring means is not limited to that as shown in FIG. 2.

Further, the present invention is not limited to the device as shown in FIG. 2 and described hereinabove, but includes all the variations and modifications which fall into the spirit and the scope of the present invention as defined in the appended claims.

The present invention is also applicable to the apparatus which is constructed by stationary members in place of the movable member such as the piston as shown.

I claim:
1. Ultrahigh pressure self-sealing device including a cylinder, pressure applying means having a diameter snugly fitting with said cylinder and axially driven in said cylinder so as to generate a high pressure in the fluid lead into said cylinder, a cup-shaped pressure receiving member having a diameter snugly fitting with said cylinder and located in front of said pressure applying means, axially movably with respect thereto, an annular, resiliently deformable packing member located in said cylinder, between said pressure receiving member and said pressure applying means in abutting relationship thereto, and core means, located concentrically in the hollow space in said annular packing member and in engagement therewith, connecting said pressure receiving member to said pressure applying means said packing member being confined axially between said pressure receiving member and said pressure applying means while simultaneously being confined radially outward with its outer periphery, by said cylinder, and radially inwardly with its inner periphery, by said core means, thereby permitting said packing member to be forcibly urged radially against said cylinder and said core means under a pressure which is greater than the pressure applied axially by said pressure applying means, by virtue of the difference between the effective area of said pressure receiving member receiving the reactionary pressure from the fluid in said cylinder and the effective pressure receiving area of said annular packing member, when said pressure applying means is driven, wherein the improvement comprises first and second means connecting said core means to said pressure receiving member and said pressure applying means respectively, such that during operation of said self-sealing device said core means is freely movable axially with respect to said pressure receiving member and said packing member, as well as to said pressure applying means, said first connecting means comprising means loosely connecting said cup-shaped member and the core means for permitting relative movement therebetween whereby a firm engagement of said core means with the inner periphery of said packing member is achieved independently of the axial movement of said pressure receiving member and said pressure applying means and substantially no axial tensile stress is generated in said core means.

2. Ultrahigh pressure self-sealing device according to claim 1, wherein a hollow cylindrical inner member is located in said cylinder between said packing member and said pressure applying means, and said pressure receiving member is provided with a coaxial blind hole opening in the face thereof which abuts against said packing member, said core means extending into said blind hole and the hollow space in said hollow cylindrical inner member and being axially movable with respect thereto by means of an appropriate clearance held therebetween.

3. Ultrahigh pressure self-sealing device according to claim 2, wherein backup ring means are provided at at least one of the positions between the outer periphery of said pressure receiving member and that of said packing member and between the outer periphery of said hollow cylindrical inner member and that of said packing member so as to obtain proper sealing effect thereof by preventing said packing member from being unduly deformed or extruded.

4. Ultrahigh pressure self-sealing device according to claim 2, wherein backup ring means are located along at least one of the inner peripheral edges of said packing member so as to obtain proper sealing effect thereof by preventing said packing member from being unduly deformed or extruded.

5. Ultrahigh pressure self-sealing device according to claim 1, wherein said packing member is made of a material being plastically flowable and self-lubricating under high pressure.

6. Ultrahigh pressure self-sealing device according to claim 3, wherein said backup ring means are made of beryllium copper of high strength and self-lubricating.

7. Ultrahigh pressure self-sealing device according to claim 4, wherein said backup ring means are made of a material of high strength and self-lubricating.